Sept. 3, 1935.   I. L. HAAG   2,013,096
PURIFICATION OF LACTIC ACID
Filed April 13, 1933
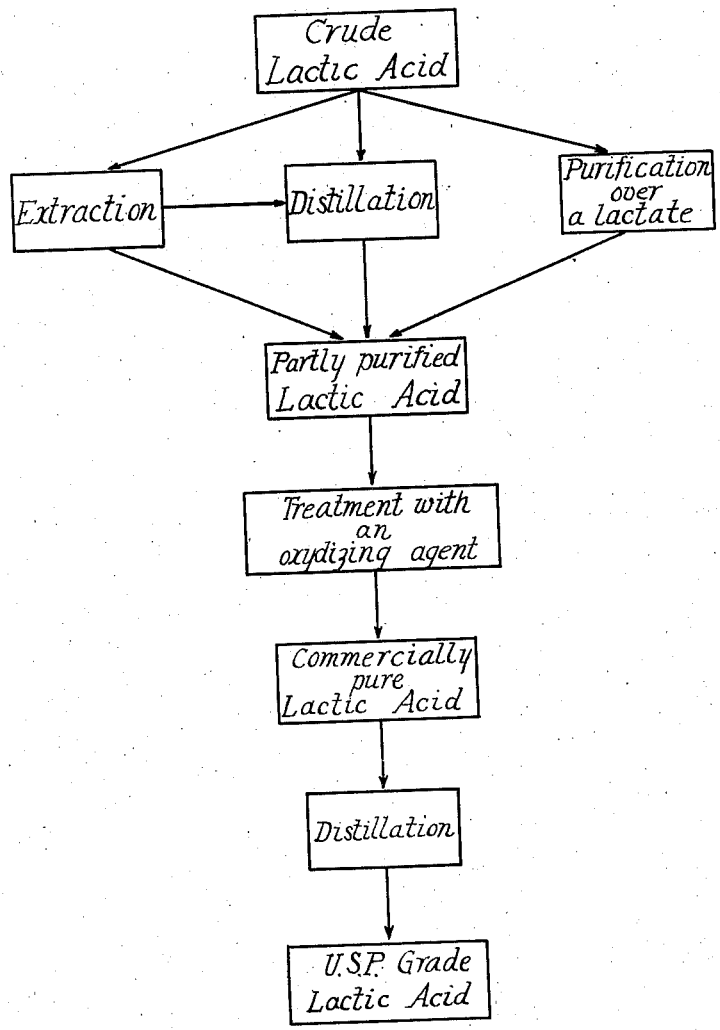
INVENTOR.
Ivan L. Haag
BY
ATTORNEY.

Patented Sept. 3, 1935

2,013,096

UNITED STATES PATENT OFFICE 2,013,096

PURIFICATION OF LACTIC ACID

Ivan L. Haag, Lakewood, Ohio, assignor, by mesne assignments, to E. I. du Pont de Nemours & Company, Wilmington, Del., a corporation of Delaware Application April 13, 1933, Serial No. 665,976

9 Claims. (Cl. 260—122)

The present invention relates to processes of purifying lactic acid and comprises treating lactic acid in aqueous solution with an oxidizing agent, particularly a peroxide compound.

Lactic acid is commonly produced by processes of fermenting carbohydrates and the so obtained crude acids are rather impure containing mineral salts, fermentation by-products and the products which accompany the crude carbohydrates used. The crude lactic acid is usually of a dark color and sometimes of an unpleasant odor. This crude acid is used to a large extent, for instance, in tanning operations where the impurities do not interfere with the use, but for edible and pharmaceutical purposes the crude acid must be submitted to various purification processes.

Extraction with organic solvents, such as ethyl ether and lately iso-propyl-ether, as disclosed in U. S. Patent 1,906,068, dated Apr. 25, 1933, to J. A. Jenemann, produces a purified lactic acid which is far superior to the crude product and can be used for edible purposes. But even this lactic acid is still slightly colored and by various tests it may be shown to contain reducing substances and easily carbonizable substances. These latter are determined by superimposing lactic acid over concentrated sulfuric acid the formation of a brown ring at the contact zone indicates presence of easily carbonizable substances. See U. S. Pharmacopœia, Tenth Decennial Revision (1926), pages 21 and 22, for this and other tests.

The extraction processes are also applicable to the purification of synthetic lactic acid where they permit the elimination of mineral impurities but it seems that with such synthetic acid no problem has arisen for the elimination of coloring matters.

Other purification processes involve distillation processes of more or less preliminarily purified lactic acid, but even such distillations are not entirely satisfactory as they fail to eliminate all coloring matters, all reducing substances and all carbonizable substances as shown by the above Pharmacopœia acid test.

It has been recently proposed to distill lactic acid under reduced pressure with introduction of steam. When applied to an extracted lactic acid this distillation process yields a pale yellow colored distillate of very good quality, with a slight odor. It shows also a slightly positive test for reducing substances when tested with Fehling's solution and shows a test for easily carbonizable substances and in this respect the product is not quite up to the standard of U. S. P. grade lactic acid.

Still another purification process for lactic acid consists in forming calcium lactate or other lactates from fermentation liquors, crystallizing the salt, decomposing it with sulfuric acid and separating the lactic acid solution from the calcium sulfate, etc. formed.

I have found that certain of the undesired impurities remaining in partly purified lactic acid are amenable to removal or destruction by the action of oxidizing agents thereon. This refers to lactic acid which has been purified by extraction with ethyl ether, iso-propyl-ether and other well known solvents which are used for this purpose, as well as to lactic acid which has preliminarily been purified by distillation or by conversion into calcium lactate, etc. and the expression "partly purified lactic acid" as used herein refers to products which have been submitted to either of these preliminary purification processes, singly or in combination.

Various oxidizing agents can be used to accomplish my purpose, such as for instance sodium or potassium bichromate. Exceedingly useful in my purification process are also peroxide compounds such as permanganates, persulfates, perborates, benzoyl-peroxide, barium or sodium peroxide, but for all around availability and efficiency I prefer to use hydrogen peroxide because it does not introduce any foreign material and on account of its inability to use up lactic acid by converting it to a salt.

The amount of oxidizing agent used depends, of course, upon the amounts of oxidizable substances contained in the lactic acid. On partly purified lactic acid a few per cent of the oxidizing agent figured on the lactic acid is sufficient to produce a far reaching reduction of the oxidizable and carbonizable material in the lactic acid.

The oxidizing agent is added to the lactic acid in aqueous solution, time is given to the agent to react, the solution is then heated, for instance, up to the boiling point and, particularly when I use hydrogen peroxide, the lactic acid is ready for ordinary commercial uses, or when using other oxidizing agents the manganese, chromium or other ions can be eliminated by well known chemical means.

I have in this manner treated extracted as well as distilled lactic acid and obtained a considerable improvement in respect to color, odor and tests for impurities in the lactic acid, without reaching, however, a purity satisfactory for U. S. P. grade.

Similarly, in submitting a partly purified lactic acid obtained from calcium lactate to an oxidizing treatment, I obtain a slightly colored acid of good appearance and good tests which, for many purposes, is superior to the acid prior to the oxidizing treatment but which does not conform as yet to the U. S. P. grade.

I have, however, found that lactic acid treated with an oxidizing agent must be further purified to make it conform to the tests prescribed for U. S. P grade; this further purification consists in distilling the lactic acid after it has been treated with hydrogen peroxide or another oxidizing agent. Here, again, I can use any of the well known distillation processes and obtain a distillate conforming to the standard for U. S. P. grade lactic acid. I, however, prefer to steam distill under vacuum and obtain thereby an excellent yield of U. S. P. grade acid without introduction of foreign substances or decomposition products.

To summarize: In order to obtain a commercial grade of pure, very light colored lactic acid I treat a partly purified lactic acid with an oxidizing agent. In order to obtain a U. S. P. grade lactic acid I submit this pure commercial grade lactic acid to a further purification which comprises a distillation whereby I obtain a U. S. P. grade lactic acid, which could not be obtained from the original, partly purified, lactic acid when the oxidation step is omitted.

I have shown in the appended flow sheet the various possibilities of obtaining a commercially pure and U. S. P. grade lactic acid according to my invention. It will be understood that no claim is made to the various processes of preparing the partly purified lactic acid and they are merely mentioned to explain how this raw material for my process is obtained.

I can reduce to a certain extent the amount of oxidizing agent required, particularly in the case of hydrogen peroxide, by first treating the lactic acid with a decolorizing, or absorbent carbon such as the product known under the trade mark "Darco" and filtering. The decolorizing carbon removes some of the material which consumes $H_2O_2$, but it is entirely insufficient to produce a product of the purity obtained after treatment with the oxidizing agent.

In order to illustrate my invention more fully the following examples are given.

Example I—To 165 parts of undistilled 45% lactic acid obtained from extracting fermentation lactic acid with iso-propyl-ether I added 6.87 parts of 30% hydrogen peroxide, the mixture was slowly heated and boiled for a few minutes; a very slight straw colored acid was obtained of a purity satisfactory for all commercial purposes.

Example II—900 parts of a 45% partly purified lactic acid as obtained from an extraction of fermentation acid with iso-propyl-ether was stirred with 2% of its weight of absorbent carbon for 1½ hours at 70 to 80° C. and filtered. To the cooled filtrate was added with stirring 37 parts of 30% hydrogen peroxide. The temperature of the solution was gradually raised to 70° C. and it was then boiled for 20 minutes. The acid obtained was of an excellent commercial purity. The so treated acid was then vacuum distilled. The temperature of the still was 105 to 110° C. and the pressure about 25 m/m of mercury absolute. The distillate of 85% lactic acid gave no brown ring test and met all other requirements for U. S. P. grade. Only about one to two per cent of the total lactic acid was decomposed by the $H_2O_2$. Without the treatment with absorbent carbon there would have been required about 49 parts of 30% $H_2O_2$ for complete purification.

Example III—A partly purified, distilled 85% lactic acid was available, it was of slight yellow color, showed a brown ring test and a positive test with Fehling solution. To 55 parts of this acid was added 0.78 part 30% hydrogen peroxide, this was warmed slowly and finally boiled. The so treated acid was practically water white and showed no brown ring test, but gave a positive test with Fehling's solution. It is a very high grade commercially pure acid. This treated acid was then diluted to 45% acid concentration and steam distilled under vacuum. An 85% acid was recovered which showed no brown ring test, no test with Fehling solution and met all requirements for U. S. P. grade lactic acid.

Example IV—1050 parts of a 45% extracted lactic acid was stirred with 1% of its weight of absorbent carbon for 2 hours at 50° C. to 85° C. and filtered, this was then directly vacuum distilled without treatment with an oxidizing agent. There was condensed 455 parts of 85% lactic acid, which was slightly colored and showed a strong brown ring according to the usual test.

This was then treated with an oxidizing agent as follows: To 405 parts of this partly purified acid there was added 15.7 parts of 30% $H_2O_2$, the mixture slowly heated and boiled for 20 minutes. It was then diluted to a 45% strength and steam distilled under vacuum. 332 parts of an 85% acid was recovered which met all U. S. P. specifications.

Example V—A lactic acid was available which had been produced by distillation at relatively high temperature of edible lactic acid. It was of 85% strength and showed a strong brown ring test. To each 100 grams of 100% acid there was added 0.855 gram of potassium permanganate and the mixture slowly heated to the boil. This was then distilled under vacuum and a lactic acid produced which was satisfactory in its tests for U. S. P. grade.

Example VI—The partly purified lactic acid of commercial edible grade of 45.7% strength was used. To this was added for each 100 grams of 100% lactic acid 8.08 grams of sodium bichromate. The mixture was allowed to stand at room temperature for one hour, then heated and maintained between 40 and 80° C. about 15 hours and then boiled for 15 to 30 minutes. After distillation a very pure acid was recovered.

It will be noted in comparing Examples II and IV that a U. S. P. acid is produced in Example II with a single distillation, the additional preliminary distillation in Example IV results in the possibility of using lesser amounts of oxidizing agent and is due to the fact that part of the oxidizable material contained in the partly purified acid remains in the first still and does not require any hydrogen peroxide for its elimination as in Example II. Practical tests have shown that the cost of the additional preliminary distillation in Example IV balances the cost of the additional peroxide in Example II and for all practical purposes the two procedures are equally satisfactory.

I do not wish to be limited in the manner of addition of the oxidizing material, it can be added to the acid or the acid added to an aqueous solution of the agent. The concentration of the acid over wide limits seems to make little difference as I have successfully purified acids of various concentrations, for instance from 45 to 75

85% and even lower. The treatment of the partly purified acid with the oxidizing agent is effected at elevated temperature and with hydrogen peroxide I obtain a very efficient purification at the boiling temperature. However, all of these are minor points.

The conditions of final distillation required to produce a U. S. P. acid, that is the temperature, degree of vacuum, type of still, etc. can also be subjected to wide variations without materially affecting the results obtained by distilling a partly purified lactic acid which has been treated with an oxidizing agent.

I claim:

1. In a process of purifying a partly purified fermentation lactic acid the step of adding a small amount of a peroxide compound to said acid and heating said mixture.

2. In a process of purifying a partly purified fermentation lactic acid the step of adding a small amount of hydrogen peroxide to said acid and heating said mixture.

3. In a process of producing a U. S. P. grade lactic acid the steps of adding a small amount of an oxidizing agent to a lactic acid containing easily carbonizable substances, heating said mixture and distilling the so treated acid.

4. In a process of producing a U. S. P. grade lactic acid the steps of adding a small amount of an oxidizing agent to a partly purified fermentation lactic acid, heating said mixture and distilling the so treated acid.

5. In a process of producing a U. S. P. grade lactic acid the steps of adding a small amount of a peroxide compound to a partly purified fermentation lactic acid, heating said mixture and distilling the so treated acid.

6. In a process of producing a U. S. P. grade lactic acid the steps of adding a small amount of hydrogen peroxide to a partly purified fermentation lactic acid, heating said mixture and distilling the so treated acid.

7. In a process of producing a U. S. P. grade lactic acid the steps of adding a small amount of hydrogen peroxide to a partly purified fermentation lactic acid, boiling the mixture and vacuum distilling the so treated acid.

8. In a process of producing a U. S. P. grade lactic acid the steps of adding a small amount of hydrogen peroxide to a lactic acid of light color but showing the presence of reducing substances and easily carbonizable substances according to the tests of the U. S. Pharmacopœia, heating the mixture and vacuum distilling the so treated acid.

9. In a process of producing a U. S. P. grade lactic acid the steps of steam distilling under vacuum an extracted fermentation lactic acid, condensing the vapors, adding a small amount of hydrogen peroxide to the condensate, boiling said condensate and steam distilling said treated acid under vacuum.

IVAN L. HAAG.